UNITED STATES PATENT OFFICE.

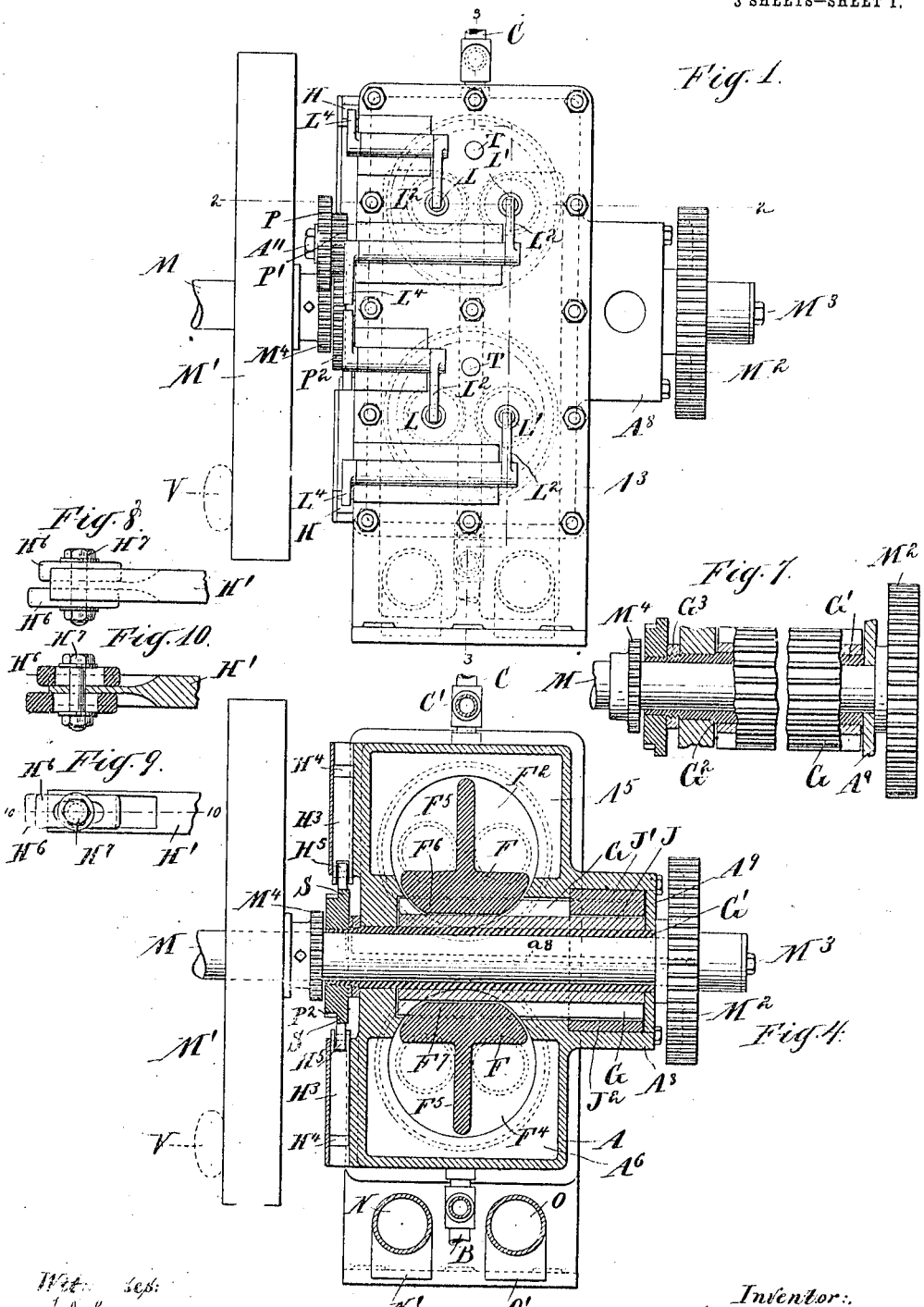

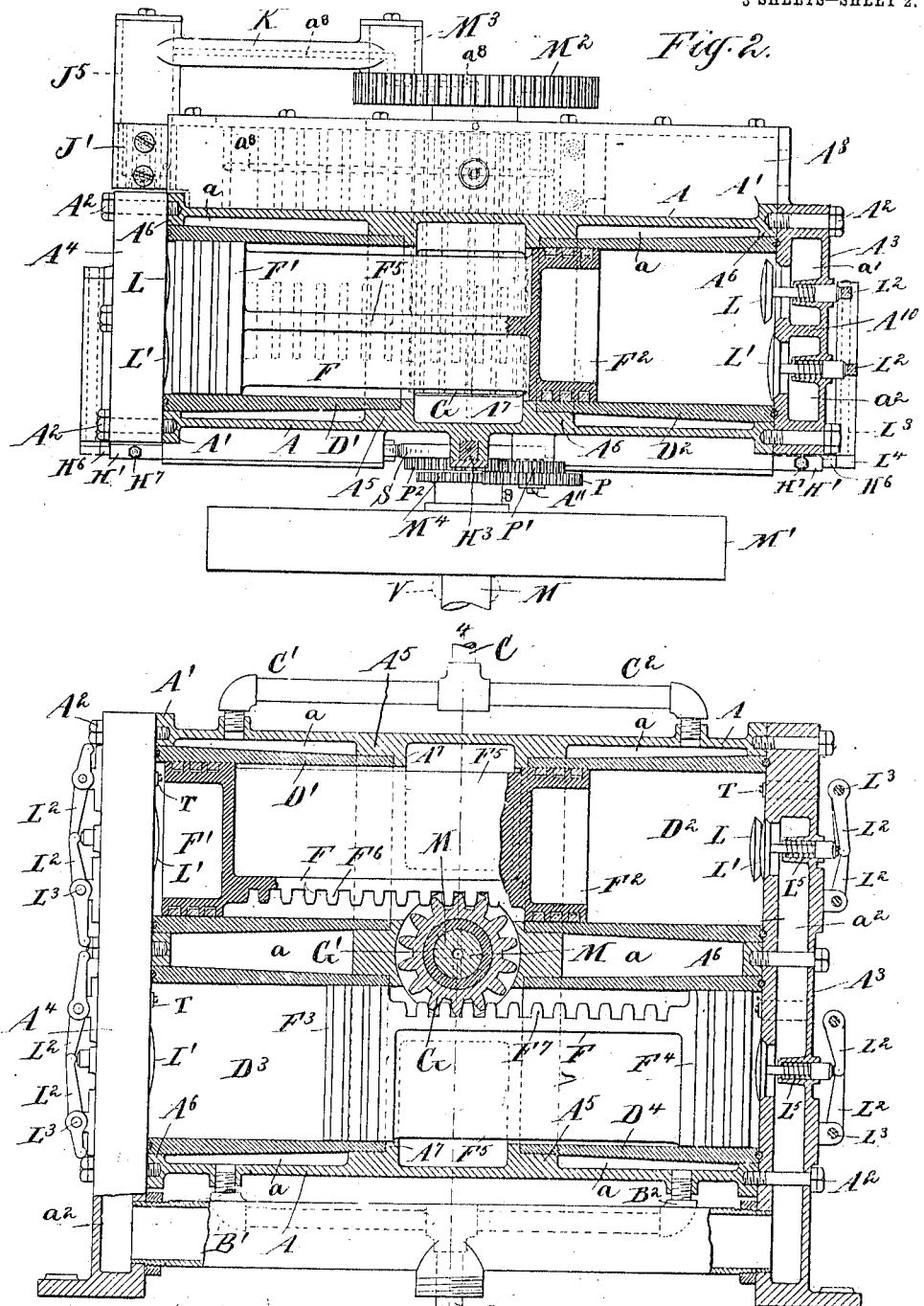

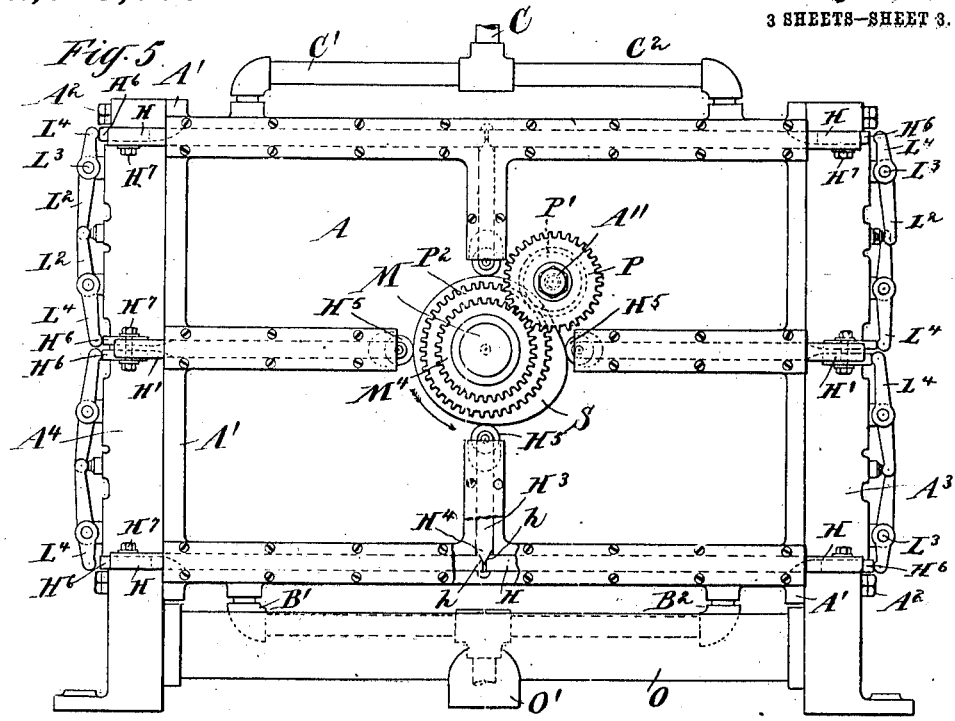
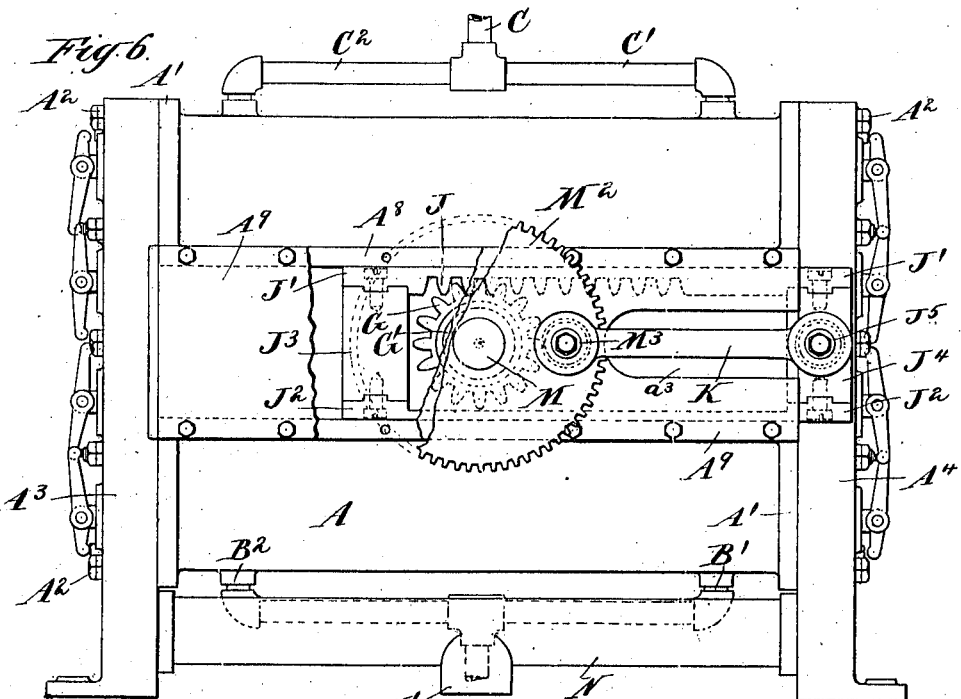

JOHN R. PEARSON, OF NEW YORK, N. Y., ASSIGNOR, BY MESNE ASSIGNMENTS, TO PEARSON RECIPROTARY MOTOR COMPANY, A CORPORATION OF NEW YORK.

INTERNAL-COMBUSTION ENGINE.

1,035,899.     Specification of Letters Patent.     Patented Aug. 20, 1912.

Application filed October 4, 1911. Serial No. 652,864.

*To all whom it may concern:*

Be it known that I, JOHN R. PEARSON, a subject of the King of Sweden, residing in the city of New York, borough of Brooklyn, in the county of Kings and State of New York, have invented a certain new and useful Improvement in Internal-Combustion Engines, of which the following is a specification.

The invention relates to motors in which the explosion of hydrocarbon vapor or gas mixed with air is the motive force, and the object of the invention is to provide an engine of this class, of extremely simple construction and few parts, which shall be highly efficient, very light and compact, permitting a plurality of cylinders to be operated in small space, and in which the reciprocations of the pistons are transformed into the required rotatory motion without materially enlarging the space thus occupied.

The invention consists in certain novel features of construction and arrangements of parts by which the above objects are attained, to be hereinafter described and pointed out in claims.

The accompanying drawings form a part of this specification and show an approved form of the invention.

Figure 1 is an end view. Fig. 2 is a plan view partly in horizontal section, the plane of section being indicated by the line 2—2 in Fig. 1. Fig. 3 is a longitudinal vertical section, taken on the line 3—3 in Fig. 1, and partly in elevation. Fig. 4 is a central vertical transverse section, on the line 4—4 in Fig. 3, and partly in elevation. Fig. 5 is a side elevation. Fig. 6 is a corresponding view of the opposite side, with certain portions broken away to show the parts within. Fig. 7 is an elevation partly in vertical section, corresponding to certain parts of Fig. 4. Fig. 8 is a fragmentary side view of a portion of the valve operating mechanism, on a larger scale. Fig. 9 is a plan view of the same. Fig. 10 is a corresponding vertical section on the line 10—10 in Fig. 9.

Similar letters of reference indicate the same parts in all the figures.

A is a casing of general rectangular form, preferably of aluminum, cored for lightness and to provide certain cooling and other passages, serving as the frame of the engine, inclosing the cylinders and pistons, and supporting the shaft M which extends transversely therethrough at the center. On each end of the casing is an external flange $A^1$ $A^1$ receiving bolts $A^2$ by which the hollow heads $A^3$ $A^4$ are strongly joined to the casing. Downwardly extending portions of the heads serve as supporting feet for the engine.

In the form of the invention illustrated four cylinders are employed, arranged in pairs one pair above the other, each cylinder in axial alinement with the other of its pair, and the axial lines of both pairs in the same vertical plane, which is also the longitudinal vertical central plane of the casing A. Thus arranged there are two cylinders on each side of the central shaft M at each end of the casing, one above and the other below the shaft. The cylinders of the upper pair are marked $D^1$ $D^2$ and the lower pair $D^3$ $D^4$; each is a cylindrical casting smoothly finished on the interior, tapered inwardly slightly on the exterior and driven from the open end of the casing into firm engagement with an internal flange $A^5$ at the inner end and at the outer in a circular opening in the internal flange $A^6$, and all are securely held against endwise movement by the application of the heads $A^3$ $A^4$ at the outer ends and the annular abutments $A^7$ in the flanges $A^5$ at the inner ends. The spaces $a\ a$ between the flanges $A^5$ $A^6$ and heads $A^3$ $A^4$ and exterior to the cylinders serve to receive cooling water entering through the branches $B^1$ $B^2$ from the pipe B and escaping through the branches $C^1$ $C^2$ of the pipe C after circulating about the cylinders.

$F^1$ $F^2$ $F^3$ $F^4$ are the pistons, one for each cylinder, joined in pairs to match to and reciprocate in the pairs of cylinders and constructed to form a combustion chamber at the closed outer end of each. The pistons forming each pair are shown as made in one, connected by a horizontal web or flange F and a stiffening rib $F^5$, and on the adjacent faces of the webs are racks $F^6$ $F^7$ in mesh with the teeth of a long pinion G extending transversely of the casing on the center line thereof and into a hollow extension $A^8$ of the casing on the exterior of the latter at one side. The pinion incloses a loosely fitted sleeve $G^1$ through which passes the shaft M carrying on one overhung end a flywheel $M^1$ and on the other, adjacent to the extension $A^8$, a crank-plate $M^2$. The casing is cored to receive the pinion which is held against axial movement by abutting at one end against the interior of the casing and at the other against the cover-plate $A^9$ for the extension $A^8$. Within the extension is a slide in the form of an open frame comprising an upper member $J^1$ having a rack $J$ on its under face in mesh with the pinion $G$, and a lower member $J^2$ beneath the pinion, both joined at the ends to blocks $J^3$ $J^4$ as shown, the whole arranged to reciprocate in the extension and to serve as a cross-head in transforming such reciprocations into a rotatory movement of the shaft $M$ through the medium of a connecting-rod $K$ pivoted at one end to a pin $J^5$ on the outer block $J^4$ and at the other to a crank-pin $M^3$ on the crank-plate $M^2$.

In each head $A^3$ $A^4$ are cored passages $a^1$ $a^2$ serving respectively as inlet and exhaust passages separated by the vertical web $A^{10}$, and in the combustion chamber of each cylinder are two valves $L$ and $L^1$ seated in the adjacent head, communicating between such chambers and passages. The valve-stems of all the valves extend through their heads $A^3$ $A^4$ and are opened against the force of their springs $L^5$ by a system of levers and fingers to be described. The inlet passages $a^1$ $a^1$ of the two heads are connected at their lower ends by a pipe $N$ having a branch $N^1$ connected to a carbureter, not shown, and the exhaust passages $a^2$ $a^2$ are similarly connected by a pipe $O$ having a branch $O^1$ leading to a muffler, not shown, or to the atmosphere.

Assuming the valves, and the ignition mechanism, not shown, to be properly timed, the operation of the engine is as follows:— Referring to Fig. 3 the charge in the combustion chamber formed by the cylinder $D^1$ and piston $F^1$ is in condition to be exploded, cylinder $D^2$ is ready to exhaust, cylinder $D^3$ has taken in a charge ready for compression, and $D^4$ is conditioned to take in its charge. The explosion in $D^1$ drives the pistons $F^1$ $F^2$ to the right and forces out the spent gases in $D^2$, and through the pinion $G$ and racks $F^6$ $F^7$ moves the pistons $F^3$ $F^4$ to the left drawing in a fresh charge in $D^4$ and compressing the charge in $D^3$ ready for the next explosion therein followed by a corresponding cycle in the other cylinders and a reversal of rotation of the pinion $G$, thus the latter is oscillated alternately in opposite directions and through the rack $J$ reciprocates the sliding frame which through its connecting-rod $K$ and the crank-pin $M^3$ rotates the shaft $M$ continuously in the direction indicated by the arrow in Fig. 5.

The sequence of explosion, exhaust, intake, and compression take place in turn in all the cylinders, and each step in the cycle follows the similar step in the several cylinders in the order of $D^1$ $D^3$ $D^4$ and $D^2$, thus after an explosion in $D^1$ the next explosion is in $D^3$, and is succeeded by explosions in $D^4$ and $D^2$, giving four effective impulses to two revolutions of the shaft.

As the shaft $M$ is rotated continuously in one direction and the long pinion $G$ has an oscillatory motion thereon the stationary sleeve $G^1$ is introduced between to provide a bearing for both and is preferably of bronze to afford better wearing surfaces for the inclosed steel shaft and inclosing steel pinion. The sleeve is held in place by a shoulder $G^2$ abutting against the interior of the casing, and a nut $G^3$ on the protruding screw-threaded end of the sleeve lying against the exterior of the casing.

By mounting the sliding frame alongside the casing and engaging the pinion $G$ in the opening between the members $J^1$ and $J^2$ the required longitudinal movement is attained without employing extended cross-head guides and the length of the motor is thus lessened. A deep notch $a^3$ in the cover-plate $A^9$ see Fig. 6 permits the required throw of the cross-head pin $J^5$.

The several valves $L$ $L^1$ are opened and held open for the required periods by levers $L^2$ which impinge upon the protruding ends of the valve-stems, and are mounted on short rock-shafts $L^3$ on the heads, which overhang on one side of the casing and are equipped with arms $L^4$ in the paths of bars $H$, $H$ and $H^1$ arranged to slide longitudinally of the casing in suitable ways milled or otherwise produced in its face. On the shaft $M$ adjacent to the flywheel $M^1$ is a gear-wheel $M^4$ in mesh with a wheel $P$ on a stud $A^{11}$ which carries a smaller pinion $P^1$ in mesh with a larger gearwheel $P^2$ loosely mounted on the overhung end of the sleeve $G$ which also carries a cam $S$. The proportions and arrangement of the gears and pinions produce one revolution of the cam for two turns of the shaft. The inner ends of the central bars $H^1$ are acted upon directly by the cam, the high point of which in its revolution forces the bars outwardly against the arms on the rockshafts and induces a corresponding opening of the valves operated thereby. The upper and lower bars $H$ $H$ are in pairs with the inner ends of each pair abutting together and having such ends beveled as at $h$. Each pair are separated and forced outwardly by the action of the pointed ends $H^4$ of slides $H^3$ mounted vertically on the casing with the inner ends in the path of the cam $S$, thus operating the bars $H$ of each pair simultaneously and inducing corresponding opening movements of the valves controlled thereby. On the inner ends of the bars $H^1$ and $H^1$ and the slides $H^3$ $H^3$ are rollers $H^5$ lying in contact with the cam, and on the outer ends of the bars are contact-pieces $H^6$ mounted in grooves and slotted to receive bolts H⁷ by which they may be nicely adjusted to produce the required degree of opening.

Spark-plugs of any approved type may supply the ignition and are indicated at T T in Figs. 1 and 3, and the engine may be started by any suitable mechanism as the usual crank-arm V indicated in dotted lines in Figs. 1, 2 and 4.

Oil passages, as indicated at $a^8$ are provided to supply lubricant to the moving parts from the exterior, and the cooling liquid may be understood to be circulated through the pipes B C and passages $a$ by any ordinary or approved form of pump, not shown.

It will be noted that by the self-contained arrangement shown but little space is occupied. By the direct action of the pistons upon the pinion G and the direct action of the latter upon the rack J the loss of power due to multiplicity of articulated joints and also the danger of derangement are materially lessened. The positive action of the pistons and pinion also permits close and uniform timing of the valve movements.

Although the invention is shown as employing four cylinders acting upon the pinion, it will be understood that the number may be increased or decreased; the same arrangement may be adapted for a single cylinder, depending upon the momentum of the flywheel and driven mechanism to complete the idle revolutions of the shaft for the exhaust, intake and compression, or one or more sets of four cylinders may be placed alongside the single set shown and arranged to act upon the same shaft.

Other modifications in the forms and proportions of the parts, as in the arrangement of valve-gear, may be made without departing from the invention, and parts may be used without the whole.

I claim:—

1. In an internal combustion engine, a cylinder, a piston therein, a rack on said piston, a pinion engaged with said rack and oscillated by the reciprocations of the latter, a shaft, a crank thereon, a toothed slide in mesh with said pinion, and a connecting-rod from said slide to said crank.

2. In an internal combustion engine, a plurality of cylinders, pistons therein, racks on said pistons, a pinion engaged with said racks and oscillated by the reciprocations of the latter, a shaft, a crank thereon, a toothed slide in mesh with said pinion, and a connecting-rod from said slide to said crank.

3. In an internal combustion engine, a pair of cylinders in axial alinement with each other, a piston for each cylinder, said pistons rigidly connected to move as one, a rack on said pistons, a pinion engaged with said rack and oscillated by the reciprocations of the latter, a shaft, and mechanism connecting said pinion and shaft whereby the reciprocatory movements of said connected pistons are transformed to rotatory motion of said shaft.

4. In an internal combustion engine, a plurality of pairs of cylinders, the cylinders of each pair arranged in axial alinement with each other, a piston for each cylinder, the pistons of each pair rigidly connected to move as one, a rack on each of such pairs of pistons, a pinion engaged with said racks and oscillated by the reciprocations of the latter, a shaft, and mechanism connecting said pinion and shaft whereby the oscillatory movements of said pinion are transformed into rotatory movement of said shaft.

5. In an internal combustion engine, a casing, a shaft extending therethrough, a pinion loosely mounted on said shaft, cylinders in said casing above and below said pinion and at a right angle to the axial line of said shaft, pistons in said cylinders, a rack on said pistons engaged with said pinion on opposite sides of and arranged to oscillate the latter on said shaft, and mechanism connecting said pinion and shaft whereby the oscillatory motions of said pinion are transformed to rotatory movement of said shaft.

6. In an internal combustion engine, a casing, a shaft extending therethrough, a pinion loosely mounted on said shaft, a pair of cylinders in axial alinement with each other above said pinion, a pair of cylinders in axial alinement with each other below said pinion, pistons for said cylinders, the pistons of each pair rigidly connected together, a rack on each pair of pistons engaged with said pinion on opposite sides of and arranged to oscillate the latter on said shaft, and mechanism connecting said pinion and shaft whereby the oscillatory motions of said pinion are transformed into rotatory movement of said shaft.

7. In an internal combustion engine, a casing, a shaft extending therethrough, a pinion loosely mounted on said shaft, a plurality of cylinders in said casing, pistons in said cylinders, racks on said pistons engaged with said pinion, a slide in said casing, teeth on said slide in mesh with said pinion, a crank on said shaft, and a connecting-rod from said slide to said crank.

8. In an internal combustion engine, a casing, a shaft extending therethrough, a pinion loosely inclosing said shaft, a plurality of cylinders in said casing, pistons in said cylinders, racks on said pistons engaged with said pinion, a slide in the form of an open frame inclosing said pinion, teeth on said slide in mesh with said pinion, a crank on said shaft, and a connecting-rod from said slide to said crank.

9. In an internal combustion engine, a casing, a shaft extending therethrough and having a crank, a sleeve loosely inclosing said shaft, a pinion loosely inclosing said sleeve and shaft, a plurality of cylinders in said casing, inlet and exhaust valves therefor, pistons in said cylinders, racks on said pistons engaged with said pinion, a slide in said casing, a connecting-rod from said slide to said crank, a gearwheel on said shaft, means on said sleeve for operating said valves.

10. In an internal combustion engine, a casing, a hollow head at each end thereof, a partition in each of said heads dividing each into inlet and exhaust chambers, a pair of cylinders in the upper portion of said casing in axial alinement with each other, and a pair of cylinders in the lower portion of said casing in axial alinement with each other, a piston for each cylinder, a rigid connection between the pistons for each of said pairs of cylinders, a rack on each of said connections, an inlet and exhaust valve for each cylinder opening from said chambers, a shaft extending through said casing transversely of the axial lines of said cylinders and between the pairs thereof, a pinion loosely inclosing said shaft and engaged with said racks whereby said pinion is oscillated, mechanism connecting said pinion and shaft whereby the oscillatory motions of the pinion are transformed to rotatory motion of said shaft, and means actuated by said shaft for operating said valves.

In testimony that I claim the invention above set forth I affix my signature. in presence of two witnesses.

JOHN R. PEARSON.

Witnesses:
CHARLES R. SEARLE,
HELEN V. RICE.